US012786248B2

(12) United States Patent
Trugman et al.

(10) Patent No.: US 12,786,248 B2
(45) Date of Patent: Nov. 3, 2026

(54) AGNOSTIC MULTIMEDIA SESSION CONTROL

(71) Applicant: Caregility Corporation, Wall Township, NJ (US)

(72) Inventors: Justin Trugman, Upper Saddle River, NJ (US); Bin Guan, Morganville, NJ (US)

(73) Assignee: CAREGILITY CORPORATION, Wall Township, NJ (US)

( * ) Notice: Subject to any disclaimer, the term of this patent is extended or adjusted under 35 U.S.C. 154(b) by 94 days.

(21) Appl. No.: 18/788,435

(22) Filed: Jul. 30, 2024

(65) Prior Publication Data

US 2025/0047728 A1 Feb. 6, 2025

Related U.S. Application Data

(60) Provisional application No. 63/516,640, filed on Jul. 31, 2023.

(51) Int. Cl.
*H04L 65/1059* (2022.01)
*H04L 65/1069* (2022.01)
*H04L 69/24* (2022.01)

(52) U.S. Cl.
CPC ...... *H04L 65/1059* (2013.01); *H04L 65/1069* (2013.01); *H04L 69/24* (2013.01)

(58) Field of Classification Search
CPC ............. H04L 65/4038; H04L 65/1069; H04L 65/1016; H04L 65/1101; H04L 65/1059; H04L 69/24; H04L 65/1036; H04L 65/80
See application file for complete search history.

(56) References Cited

U.S. PATENT DOCUMENTS 7,532,628 B2 * 5/2009 Lepore ................ H04L 65/1094 370/401
10,440,327 B1 10/2019 Bytyqi
(Continued)

FOREIGN PATENT DOCUMENTS

CN 112040073 A 12/2020
WO 2024037931 A1 2/2024

OTHER PUBLICATIONS

Hautakorpi, et al., Requirements from Session Initiation Protocol (SIP) Session Border Control (SBC) Deployments, Internet Engineering Task Force (IETF), Apr. 2010, pp. 1-26.
(Continued)

*Primary Examiner* — Tonia L Dollinger
*Assistant Examiner* — Joseph M Cousins
(74) *Attorney, Agent, or Firm* — RANKIN, HILL & CLARK LLP

(57) ABSTRACT

A computer-implemented method of connecting terminals in a media stream includes receiving a first user input at a first terminal with a media agnostic software development kit (SDK), and initiating a session between the first terminal and a second terminal with a session controller based on the first user input received with the SDK. The method also includes selecting a media provider from among a plurality of media providers for use by the second terminal during the session with the session controller, where the session controller supports a media stream between the SDK at the first terminal and the selected media provider at the second terminal, and transmitting outgoing media data from the SDK at the first terminal to the selected media provider at the second terminal, or incoming media data from the selected media provider at the second terminal to the SDK at the first terminal.

18 Claims, 5 Drawing Sheets

(56) References Cited

U.S. PATENT DOCUMENTS

| | | | | |
|---|---|---|---|---|
| 2012/0190353 | A1* | 7/2012 | Harwell | H04W 4/02 455/422.1 |
| 2016/0345167 | A1* | 11/2016 | Li | H04L 69/14 |
| 2018/0338347 | A1* | 11/2018 | Lee | H04L 65/1104 |
| 2019/0087553 | A1* | 3/2019 | Barak | H04L 51/56 |
| 2019/0387030 | A1* | 12/2019 | Sridhar | H04L 65/1069 |
| 2022/0070524 | A1* | 3/2022 | Iyer | H04N 21/2393 |
| 2024/0098120 | A1* | 3/2024 | Lu | H04L 65/1069 |
| 2025/0119402 | A1* | 4/2025 | Cantor | G06F 40/103 |

OTHER PUBLICATIONS

Martinez- Espronceda, et al., A Novel Software Development Kit (SDK) to Foster Adoption of Health Informatics Standards in Personal Health Device (PHD) Communications Hamiltonian Mechanics, 2012, pp. 66-73.

Battaglia, et al., An Open and Portable Software Development Kit for Handheld Devices with Proprietary Operating Systems, IEEE Transactions on Consumer Electronics, vol. 55, No. 4, Nov. 2009, pp. 2436-2444.

3rd Generation Partnership Project; Technical Specification Group Services and System Aspects; IP Multimedia Subsystem (IMS); Stage 2 (Release 18), 3GPP TS 23.228, Jun. 2023, pp. 1-387.

International Search Report and Written Opinion for PCT/US2024/040119, dated Oct. 8, 2024, 15 pages.

* cited by examiner

AGNOSTIC MULTIMEDIA SESSION CONTROL

CROSS-REFERENCE TO RELATED APPLICATIONS

This application claims the benefit of U.S. Provisional Patent Application, Ser. No. 63/516,640 entitled "AGNOSTIC MULTIMEDIA SESSION CONTROL", filed on Jul. 31, 2023; the entirety of the above-noted application(s) is incorporated by reference herein.

BACKGROUND

Current virtual and hybrid care multimedia session systems often rely on a single multimedia provider as predetermined means for supporting a multimedia stream. This approach necessitates a significant commitment to a specific technology, restricting the flexibility and adaptability of the overall systems. As such, users are bound to a particular multimedia provider and are limited to its features, capabilities, and video quality of experience scenarios.

The current system's reliance on a single multimedia provider poses several drawbacks. One significant disadvantage is the lack of flexibility to cater to diverse user preferences, requirements, and network conditions. Different multimedia providers offer unique features and optimizations for specific scenarios, such as video quality, bandwidth management, or specialized functionalities. By being confined to a single multimedia provider, users are unable to take advantage of these tailored capabilities, limiting their ability to achieve the best possible experience.

Moreover, the dependence on a single multimedia platform exposes users to potential limitations and risks associated with that particular provider. In this regard, system outages, performance issues, or changes in terms of service by the provider can directly impact the availability and quality of virtual and hybrid care sessions, leading to disruptions in critical healthcare services.

Furthermore, reliance on single multimedia platforms lacks adaptability to evolving multimedia technologies and emerging providers as new multimedia platforms enter the market with improved features and enhanced user experiences. Consequently, existing systems struggle to integrate seamlessly with advancements in multimedia provider technologies, thus limiting innovation and hindering the adoption of state-of-the-art technologies in a variety of settings that may call for unique communication feeds and functionalities, including healthcare settings. As another consequence, switching from one multimedia provider to another when using such dedicated systems requires relatively large investments in platform design, architecture, demonstration, testing, proof of concept, pilot, budgeting, planning, migration, user training, and other program elements.

The noted limitations of current communication systems in terms of flexibility, adaptability, and integration with diverse multimedia providers underscores a need for an improved system that enables a media agnostic platform.

SUMMARY

According to one aspect, a computer-implemented method of connecting terminals in a media stream includes receiving a first user input at a first terminal with a media agnostic software development kit (SDK), and initiating a session between the first terminal and a second terminal with a session controller based on the first user input received with the SDK. The method also includes selecting a media provider from among a plurality of media providers for use by the second terminal during the session with the session controller, where the session controller supports a media stream between the SDK at the first terminal and the selected media provider at the second terminal, and transmitting outgoing media data from the SDK at the first terminal to the selected media provider at the second terminal, or incoming media data from the selected media provider at the second terminal to the SDK at the first terminal as part of the media stream.

According to another aspect, a system for connecting terminals in a media stream includes a first terminal that receives a first user input with a media agnostic software development kit (SDK). The system also includes at least one processor that initiates a session between the first terminal and a second terminal with a session controller based on the first user input received with the SDK. The at least one processor also selects a media provider from among a plurality of media providers for use by the second terminal during the session with the session controller, where the session controller supports a media stream between the SDK at the first terminal and the selected media provider at the second terminal. The at least one processor also transmits outgoing media data from the SDK at the first terminal to the selected media provider at the second terminal, or incoming media data from the selected media provider at the second terminal to the SDK at the first terminal as part of the media stream.

According to another aspect, a non-transitory computer readable storage medium stores instructions that, when executed by a computer having a processor, causes the processor to perform a method. The method includes receiving first user input at a first terminal with a media agnostic software development kit (SDK), and initiating a session between the first terminal and a second terminal with a session controller based on the first user input received with the SDK. The method also includes selecting a media provider from among a plurality of media providers for use by the second terminal during the session with the session controller, where the session controller supports a media stream between the SDK at the first terminal and the selected media provider at the second terminal. The method also includes transmitting outgoing media data from the SDK at the first terminal to the selected media provider at the second terminal, or incoming media data from the selected media provider at the second terminal to the SDK at the first terminal as part of the media stream.

DETAILED DESCRIPTION

Figure 1:
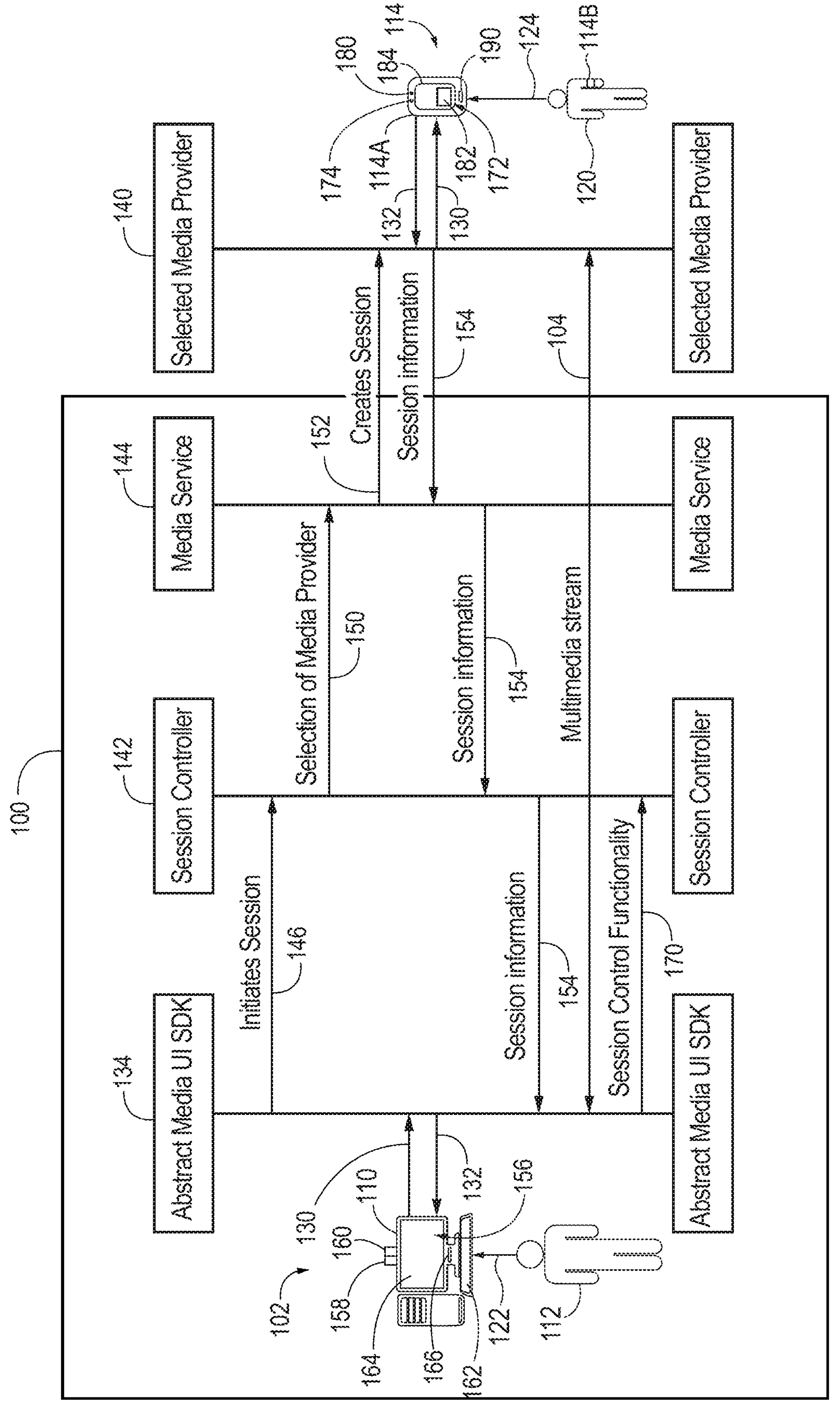
FIG. 1 is a diagram of an exemplary system for connecting terminals in a media stream.

The systems and methods disclosed herein are configured to facilitate a media stream between a plurality of devices in a communications network using a media provider selected from among a plurality of media providers. The media stream is regulated with a session controller that may select the media provider for supporting the media stream. As such, the session controller provides media agnostic structure that supports the media stream between the plurality of devices.

The plurality of devices are adapted to function as a first terminal and a second terminal, where the first terminal and the second terminal communicate with each other through the media stream. In this manner, the first terminal and the second terminal may each include medical devices and communication devices that collectively function as terminals in the media stream. As such, the session controller may select a media provider based on a predetermined user preference, a user request received as part of the first user input, or a unique functionality among the plurality of media providers for accommodating the plurality of devices in the media stream.

Definitions

The following includes definitions of selected terms employed herein. The definitions include various examples and/or forms of components that fall within the scope of a term and that may be used for implementation. The examples are not intended to be limiting. Furthermore, the components discussed herein may be combined, omitted, or organized with other components or into different architectures.

“Bus,” as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

“Component,” as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

“Computer communication,” as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

“Communication interface” as used herein may include input and/or output devices for receiving input and/or devices for outputting data. The input and/or output may be for controlling different features, components, and systems. Specifically, the term “input device” includes, but is not limited to keyboard, microphones, pointing and selection devices, cameras, imaging devices, video cards, displays, push buttons, rotary knobs, and the like. The term “input device” additionally includes graphical input controls that take place within a user interface which may be displayed by various types of mechanisms such as software and hardware-based controls, interfaces, touch screens, touch pads or plug and play devices. An “output device” includes, but is not limited to, display devices, and other devices for outputting information and functions.

“Computer-readable medium,” as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

“Data store,” as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

“Display,” as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

A “disk” or “drive”, as used herein, may be a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

“Logic circuitry,” as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device" or "mobile device", as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, which may be received, transmitted, and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

System Overview

Referring now to the drawings, the drawings are for purposes of illustrating one or more exemplary embodiments and not for purposes of limiting the same. FIG. 1 depicts a system 100 for connecting a plurality of terminals 102 in a media stream 104. As shown in FIG. 1, the plurality of terminals 102 includes a first terminal 110 operated by a first user 112, and a second terminal 114 operated by a second user 120. In this manner, the first terminal 110 may receive a first user input 122 from the first user 112, and the second terminal 114 receives a second user input 124 from the second user 120.

The first terminal 110 transmits outgoing media data 130 to the second terminal 114, and receives incoming media data 132 from the second terminal 114 via the media stream 104 based on the first user input 122 and the second user input 124. The second terminal 114 transmits the incoming media data 132 to the first terminal 110, and receives the outgoing media data 130 from the first terminal 110 via the media stream 104 based on the first user input 122 and the second user input 124.

Each of the outgoing media data 130 and the incoming media data 132 may include a plurality of data feeds transmitted through the media stream 104 at the same time, such as image data, video data, text data, audio data, and specialized device data feeds. As such, the media stream 104 may be a multimedia stream where the first terminal 110 and the second terminal 114 communicate multimedia information with each other at the same time. Also, media providers that contribute to the media stream 104 may be multimedia providers that support a plurality of data feeds or media communicated between the first terminal 110 and the second terminal 114 as part of the media stream 104.

The media stream 104 is supported between a user interface (UI) software development kit (SDK) 134 at the first terminal 110 and a selected media provider 140 at the second terminal 114. In this regard, the first terminal 110 communicates information with the media stream 104 through the SDK 134, and the second terminal 114 communicates information with the media stream 104 through the selected media provider 140.

The system 100 includes a session controller 142 and a media service 144 that support the media stream 104 between the plurality of terminals 102, including the first terminal 110 and the second terminal 114. More specifically, the session controller 142 and the media service 144 support the media stream 104 between the SDK 134 at the first terminal 110 and the selected media provider 140 at the second terminal 114.

The session controller 142 initiates a session between the first terminal 110 and the second terminal 114 based on the first user input 122 received with the SDK 134, indicated by arrow 146. The first terminal 110 and the second terminal 114 communicate information to each other with the media stream 104 in the session initiated by the session controller 142. The session controller 142 also selects the selected media provider 140 from among a plurality of media providers 148 (see FIG. 2) for use by the second terminal 114 during the session with the session controller 142, indicated by arrow at selection of media provider 150. The session controller 142 executes the selected media provider 140 via the media service 144 to create the session between the first terminal 110 and the second terminal 114, indicated by arrow 152. The session information may be unique to each session, which provides the negotiation between two communication parties (e.g., the first terminal 110 and the second terminal 114). The session information may include participant details, session identifiers, media metadata, security credentials, connection information, session timing, control info, QoS info, etc. Each SDK 134 and media provider 140 may have their own API to negotiate.

The SDK 134 and the plurality of media providers 148 are each configured to adapt a plurality of device hardware types including a plurality of different operating systems to function as the first terminal 110 and the second terminal 114. For example, the SDK 134 may communicate to the media provider 148 based on a predefined API so that the device hardware types are not mixed with one another. In this manner, the system 100 may incorporate a variety of devices to operate as the first terminal 110 using the SDK 134, and incorporate a variety of devices to operate as the second terminal 114 using the plurality of media providers 148. With this construction, the SDK 134, and the plurality of media providers 148 enable seamless integration and compatibility across various devices, operating systems, and browsers, including desktop computers, laptops, smartphones, and tablets.

The selected media provider 140 generates session information 154 at the second terminal 114 based on the second user input 124. For example, when the second user input 124 is verbal communication captured by the second camera 174 and the second microphone 180, the selected media provider 140 may generate session information 154 that is a timestamp associated with a time the second user input 124 was captured. The selected media provider 140 transmits the session information 154 at the second terminal 114 to the media service 144. The media service 144 transmits the session information 154 received from the selected media provider 140 to the session controller 142. The session controller 142 transmits the session information 154 received from the media service 144 to the SDK 134 at the first terminal 110.

With continued reference to FIG. 1, the first terminal 110 includes a first user interface 156 configured by the SDK 134 for receiving the first user input 122 from the first user 112 and outputting information (e.g., the outgoing media data 130, the incoming media data 132, the session information 154, or other information) to the first user 112. In this regard, the first user interface 156 includes a first camera 158 that generates video data of the first user 112 as part of the first user input 122. The first user interface 156 also includes a first microphone 160 that generates audio data of the first user 112 as part of the first user input 122. The first user interface 156 also includes a first keyboard 162 that generates text data by the first user 112 as part of the first user input 122. In this manner, the first terminal 110 receives the first user input 122 with the SDK 134.

The first user interface 156 may output the outgoing media data 130, the incoming media data 132, and the session information 154 to the first user 112. In this regard, the first user interface 156 includes a first display 164 that outputs image data and video data to the first user 112 as part of the outgoing media data 130, the incoming media data 132, and the session information 154. The first user interface 156 also includes a first speaker 166 that outputs audio data as part of the outgoing media data 130, the incoming media data 132, and the session information 154. Each of the first camera 158, the first microphone 160, the first keyboard 162, the first display 164, and the first speaker 166 is supported by the SDK 134 on the first user interface 156 for communicating information with the media stream 104.

The SDK 134 communicates directly with the session controller 142 based on the first user input 122. In this manner, the SDK 134 may cause the session controller 142 to execute the selected media provider 140 and the media service 144 based on the first user input 122, as indicated by arrow 170.

With this construction, the SDK 134 incorporates the session controller 142 in a manner that abstracts session control functionality independent of any single media provider among the plurality of media providers 148. In the session controller 142, there may be specific API working with a specific media provider so that there is one to one match or correspondence for communications. As such, the session controller 142 may act as a central hub, enabling seamless communication and coordination between different media providers among the plurality of media providers 148. The abstracted session control functionality of the session controller 142 also provides an adaptable approach to new media providers that become available within the plurality of media providers 148 over time, where the SDK 134 executes the new media providers using the session controller 142.

The abstracted session control functionality of the session controller 142 also provides backward compatibility with established communication protocols such as SIP (Session Initiation Protocol) and H.323. The session controller 142, for example, may include one or more legacy protocols such as the SIP, H.323, etc. to ensure backwards compatibility. In this regard, established communication protocols are incorporated in communication functions of the SDK 134, the session controller 142, and the media service 144 to support legacy technologies adapted to function as the first terminal 110. With this construction, the SDK 134, the session controller 142, and the media service 144 architecture allows for dynamic adaptation to different media formats and ensures real-time data synchronization between the first terminal 110 and the second terminal 114, providing a seamless and uninterrupted virtual care experience including both legacy technologies and relatively new devices. Also, the SDK 134, the session controller 142, and the media service 144 may support a variety of devices to function as the first terminal 110, including legacy devices available to the first user 112.

The session controller 142 and the media service 144 may support the media stream 104 from the first terminal 110, the second terminal 114, or another computing device operatively connected to the SDK 134 at the first terminal 110 and the selected media provider 140 at the second terminal 114 without departing from the scope of the present disclosure.

The session controller 142 interfaces with the media service 144 to interact with the plurality of media providers 148. In this regard, the media service 144 interacts with the plurality of media providers 148 to leverage unique capabilities and functionalities of individual media providers that may be selected to support the media stream 104. Exemplary capabilities and functionalities include video quality, network conditions, reliability, user convenience or experience, computational requirements, feature sets, cost effectiveness, and specialized device data feeds. The SDK 134 may also execute each of the session controller 142, the media service 144, and the selected media provider 140 based on a predetermined user preference, or a user request received as part of the first user input 122.

With this construction, the system 100 may adapt to specific video quality or experience scenarios offered by each media provider in the plurality of media providers 148, or unique functionalities each media provider may have, ensuring optimized media delivery in the media stream 104. In an embodiment, the session controller 142 selects the selected media provider 140 based on provider-specific optimizations such as advanced video quality algorithms, adaptive bitrate control, noise reduction, and collaboration tools to provide improved audio and video quality, reduced latency, and increased stability in the media stream 104 between the first terminal 110 and the second terminal 114.

The second terminal 114 includes a second user interface 172 that has similar features, and functions in a similar manner as the first user interface 156 for outputting information to the second user 120 and receiving the second user input 124 from the second user 120. The second user interface 172 is configured by the selected media provider 140 for receiving the second user input 124 from the second user 120 and outputting information to the second user 120. In this regard, the second user interface 172 includes a second camera 174 that generates video data of the second user 120 as part of the second user input 124. The second user interface 172 also includes a second microphone 180 that generates audio data of the second user 120 as part of the second user input 124. The second user interface 172 also includes a second keyboard 182 that generates text data by the second user 120 as part of the second user input 124.

The second user interface 172 outputs the outgoing media data 130, the incoming media data 132, and the session information 154 to the second user 120. In this regard, the second user interface 172 includes a second display 184 that outputs image data and video data to the second user 120 as part of the outgoing media data 130, the incoming media data 132, and the session information 154. The second user interface 172 also includes a second speaker 190 that outputs audio data as part of the outgoing media data 130, the incoming media data 132, and the session information 154. Each of the second camera 174, the second microphone 180, the second keyboard 182, the second display 184, and the second speaker 190 is supported by the selected media provider 140 on the second user interface 172 for communicating information with the media stream 104.

While, as depicted, the first terminal 110 is a desktop computer configuration, and the second terminal 114 includes a mobile device 114A and a blood pressure cuff 114B, the first terminal 110 and the second terminal 114 may each additionally or alternatively include a variety of input devices and/or output devices for communicating the outgoing media data 130, the incoming media data 132, and the session information 154 with the first user interface 156 and the second user interface 172 without departing from the scope of the present application. Such input and output devices may include computers, tablets, phones, and other mobile devices, and may include dedicated devices including adapted cameras, microphones, position sensors, scales, and specialized devices. Specialized devices may include medical devices that produce a data feed indicating a health aspect of a user, such as a blood pressure cuff, a heart monitor, a thermometer, a blood oxygenation monitor, an ultrasound machine, an electrocardiogram monitor, an X-ray machine, a magnetic resonance imaging device, a computed tomography device, a doppler device, an endoscopy device, a dermatoscope, a spirometer, a bone densitometer, a blood glucose monitor, a blood gas analyzer, and point-of-care testing devices.

Figure 2:
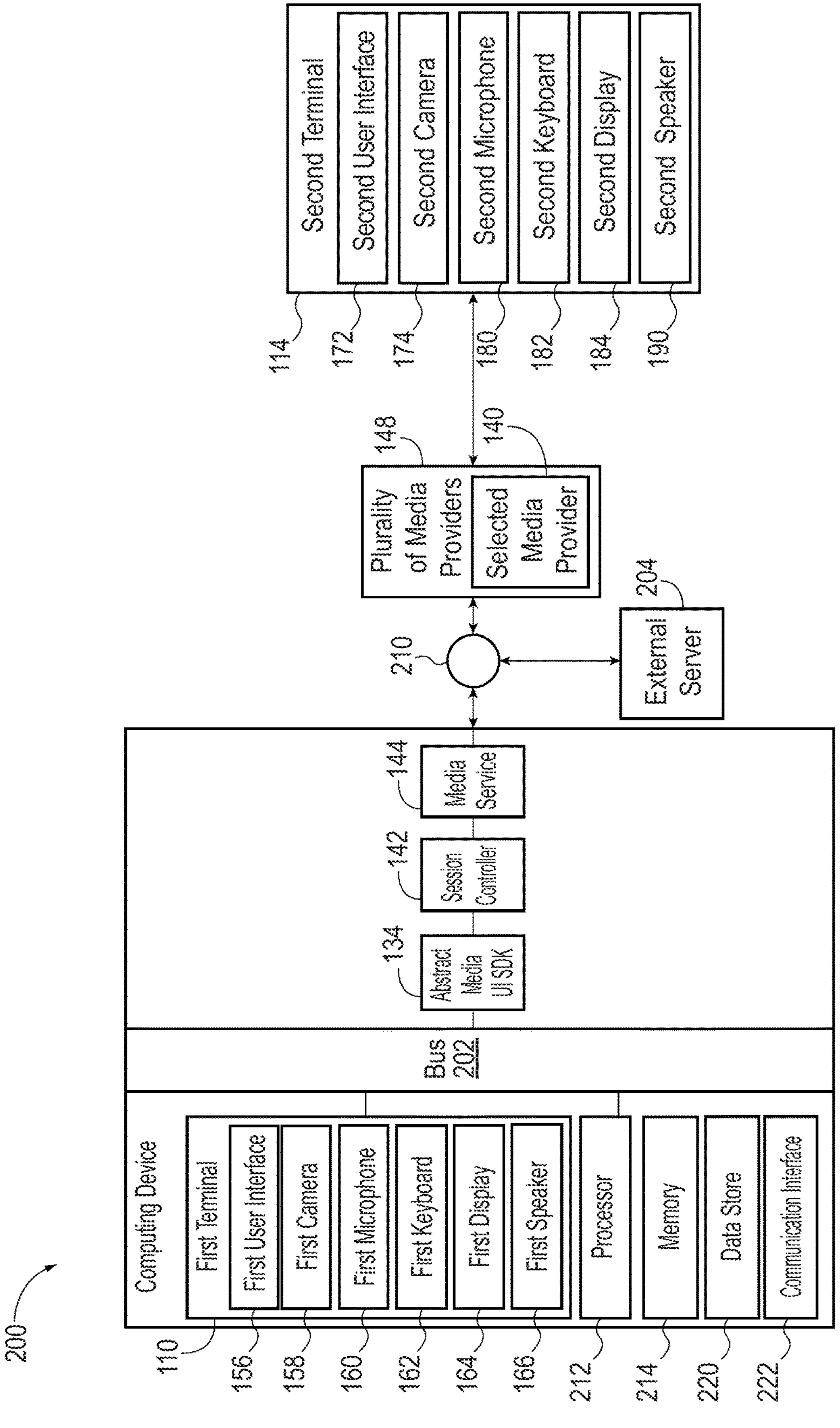
FIG. 2 is an exemplary operating environment of the system configured to carry out a process flow for connecting terminals in a media stream.

FIG. 2 depicts an exemplary component diagram of an operating environment 200 of the system 100 including the first terminal 110 operatively connected to the second terminal 114. Each of the first terminal 110 and the second terminal 114, including the components of the first user interface 156 and the second user interface 172 supported thereon, are operatively connected with each other, and may be interconnected through the network 210. The components of the operating environment 200, as well as the components of other systems, hardware architectures, and software architectures discussed herein, may be combined, omitted, or organized into different architectures for various embodiments.

The first camera 158 and the second camera 174 are each configured to generate image data and video data, and transmit the image data and the video data to the first terminal 110 and the second terminal 114. The first camera 158 and the second camera 174 may each include a combination of optical, infrared, or other cameras for generating the image data and the video data. The first camera 158 and the second camera 174 may each additionally or alternatively include light detection and ranging (LiDAR) systems, position sensors, proximity sensors, temperature sensors, and a variety of other sensors and sensor combinations for generating image data and video data on the first user 112 and the second user 120 during a session between the first terminal 110 and the second terminal 114.

The first terminal 110 and the second terminal 114 are operatively connected to each other and an external server 204 via a network 210. The network 210 supports a cloud computing platform operatively connected to the first terminal 110 and the second terminal 114. The SDK 134 communicates the media stream 104 and the session information 154 with the selected media provider 140 through the session controller 142 and the media service 144 on the cloud computing platform. The SDK 134, the session controller 142, the media service 144, and the plurality of media providers 148 may be provided on the first terminal 110, the network 210, the external server 204, or the second terminal 114 for performing recited functions without departing from the scope of the present disclosure.

The first terminal 110 and the second terminal 114 may be capable of providing wired or wireless computer communications utilizing various protocols to send and receive electronic signals internally to and from components of the operating environment 200. Additionally, the first terminal 110 and the second terminal 114 may be operably connected for internal computer communication via the bus 202 (e.g., a Controller Area Network (CAN) or a Local Interconnect Network (LIN) protocol bus) to facilitate data input and output between the first terminal 110, the second terminal 114, and the components of the operating environment 200.

The first terminal 110 includes a computing device having a processor 212, a memory 214, a data store 220, and a communication interface 222, which are each operably connected for computer communication via the bus 202. The communication interface 222 includes the first camera 158, the first microphone 160, the first keyboard 162, the first display 164, and the first speaker 166, and provides software and hardware to facilitate data input and output between the components of the first terminal 110 and other components, networks, and data sources described herein.

The second terminal 114 includes similar features and functions in a similar manner as the first terminal 110 for processing data and communicating with system components. In view of this, further description of components forming the second terminal 114 is omitted for the sake of brevity.

Methods for Operating the Information Generation System

Figure 3:
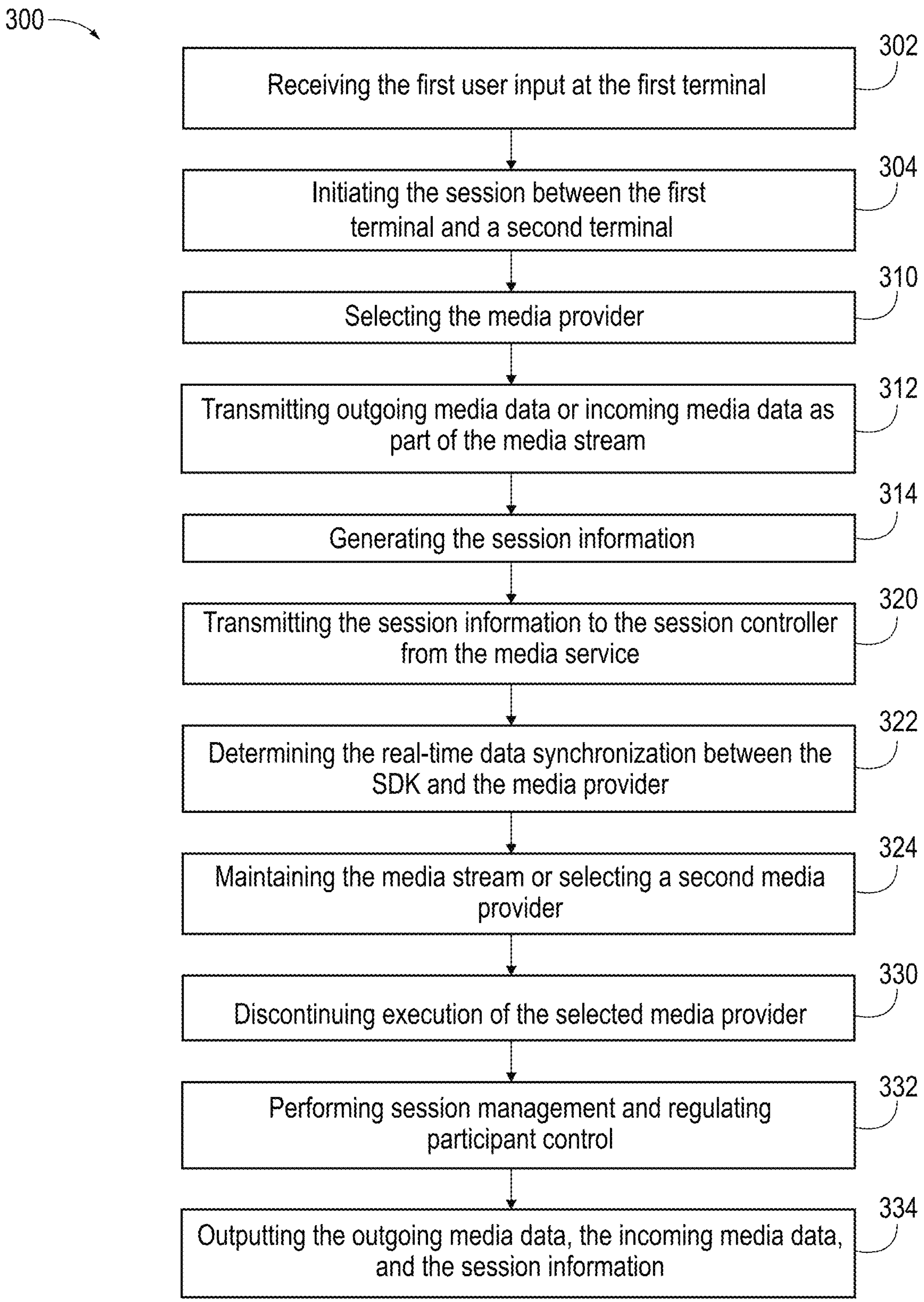
FIG. 3 is an exemplary process flow executed by the system of FIG. 1.

Referring to FIG. 3, a computer-implemented method of connecting terminals in a media stream will be described according to an exemplary embodiment. FIG. 3 will be described with reference to FIGS. 1 and 2. For simplicity, the method 300 will be described as a sequence of blocks, but the elements of the method 300 may be organized into different architectures, elements, stages, and/or processes.

At block 302, the method 300 includes receiving the first user input 122 with the SDK 134, and generating the outgoing media data 130 at the first terminal 110 based on the first user input 122. The outgoing media data 130 indicates a state of the first user 112, and the incoming media data 132 indicates a state of the second user 120. The state of the first user 112 and the state of the second user 120 may each be indicated by text data, audio data, image data, and video data, respectively based on the first user input 122 and the second user input 124. The state of the first user 112 and the state of the second user 120 may include direct verbal, sign, or text communications including questions and responses provided directly by the first user 112 and the second user 120.

With continued reference to block 302, the method 300 includes formatting the first user interface 156 with the SDK 134 such that the first user interface 156 is configured to receive the first user input 122 and output the incoming media data 132 to the first user 112. The SDK 134 formats the first user interface 156 in the same manner for each device adapted to function as the first terminal 110. In this regard, the SDK 134 organizes tools, widgets, and informational displays provided by the selected media provider 140, the session controller 142, and the media service 144 onto the first user interface 156 in a shared display configuration on the first display 164.

In the shared display configuration, the tools, widgets, and informational displays are organized in a same relative positioning with respect to each other, and to output elements on the first display 164, including the outgoing media data 130, the incoming media data 132, and the session information 154. By providing the first user interface 156 in the same manner across different platforms and devices, the SDK 134 normalizes user experience for the first user 112 and eliminates a need for the first user 112 to adapt to different interfaces based on the specific device adapted to function as the first terminal 110.

At block 304, the method 300 includes initiating a session between the first terminal 110 and the second terminal 114 with the session controller 142 based on the first user input 122 received at the SDK 134. In an embodiment, the method 300 includes executing the selected media provider 140 with the session controller 142 via a media service 144 to create the session between the first terminal 110 and the second terminal 114. Initiating the session may also include the SDK 134 communicating directly with the session controller 142, and causing the session controller 142 to execute the selected media provider 140 based on the first user input 122.

At block 310, the method 300 includes selecting a media provider 140 from among the plurality of media providers 148 for use by the second terminal 114 during the session with the session controller 142, where the session controller 142 supports the media stream 104 between the SDK 134 at the first terminal 110 and the selected media provider 140 at the second terminal 114. In an embodiment, each media provider in the plurality of media providers 148 is compatible with the first terminal 110 to generate the incoming media data 132 for representation by the first user interface 156 at the first terminal 110, and compatible with the second terminal 114 to represent the outgoing media data 130 with the second user interface 172 at the second terminal 114. Selecting the media provider 140 among the plurality of media providers 148 includes selecting the media provider 140 based on a predetermined user preference, a user request received as part of the first user input 122, or a unique functionality among the plurality of media providers 148.

In a further embodiment, the selected media provider 140 is a second selected media provider, and the method 300 further includes selecting a first media provider from among the plurality of media providers 148. In the embodiment, the session controller 142 supports the media stream 104 between the SDK 134 and both the first media provider and the second media provider at the same time. The first media provider and the second media provider communicate information between the SDK 134 and the second terminal 114 independently of each other, and in parallel to each other. The second media provider may include a function that is unique to the first media provider in the media stream. In this regard, the unique function of the second media provider may be supporting a biometric data feed, a video data feed, an audio data feed, or a text data feed in the media stream 104.

In an alternative embodiment, the method 300 includes interfacing the first media provider and the second media provider in the media stream 104. In the alternative embodiment, the method 300 includes selecting the first media provider for use by the SDK 134 during the session, where the first media provider is different from the second media provider and generates the outgoing media data 130 based on the first user input 122 received by the SDK 134 at the first terminal 110. The alternative embodiment further includes interfacing the first media provider with the second media provider in the media stream 104, where the media stream 104 is supported between the SDK 134 at the first terminal 110 and the second media provider at the second terminal 114 through the first media provider.

At block 312, the method 300 includes transmitting the outgoing media data 130 from the SDK 134 at the first terminal 110 to the selected media provider 140 at the second terminal 114, or transmitting the incoming media data 132 from the selected media provider 140 at the second terminal 114 to the SDK 134 at the first terminal 110 as part of the media stream 104. In an embodiment, the method 300 includes transmitting the outgoing media data 130 to the second terminal 114 via the SDK 134 and the selected media provider 140 as part of the media stream 104. The method 300 may also include transmitting the incoming media data 132 to the first terminal 110 via the SDK 134 and the selected media provider 140 as part of the media stream 104 based on the second user input 124 at the second terminal 114.

At block 314, the method 300 includes generating the session information 154 associated with the selected media provider 140 at the second terminal 114. The selected media provider 140 may generate the session information 154 at the second terminal 114 during the session, where the session information 154 is associated with the media stream 104.

In this regard, the session information 154 is associated with the media stream 104 with respect to time, such that the session information 154 generated at the same time as the outgoing media data 130 or the incoming media data 132 is associated therewith. With this construction, the session information 154 may indicate a time the first user input 122 is received at the first terminal 110, and the outgoing media data 130 is generated based on the first user input 122. Also, the session information 154 may indicate a time the second user input 124 is received at the second terminal 114, and the incoming media data 132 is generated based on the second user input 124.

At block 320, the method 300 includes transmitting the session information 154 to the session controller 142. In this regard, the selected media provider 140 transmits the session information 154 to the media service 144, and the media service 144 transmits the session information 154 from the selected media provider 140 to the session controller 142. As such, the method 300 includes transmitting the session information 154 to the session controller 142 from the selected media provider 140 via the media service 144. In an embodiment, the method 300 further includes transmitting the session information 154 from the session controller 142 to the SDK 134 at the first terminal 110, and outputting the session information 154 at the first user interface 156 with the outgoing media data 130 and the incoming media data 132.

At block 322, the method 300 includes determining a real-time data synchronization between the SDK 134 and the selected media provider 140 based on the session information 154 received at the session controller 142 from the media service 144.

At block 324, the method 300 includes maintaining the media stream 104 supported by the selected media provider 140, or selecting a second media provider from among the plurality of media providers 148 with the session controller 142 based on the determined real-time synchronization, where the second media provider supports the media stream 104. In this manner, the method 300 provides a media agnostic system capable of executing a variety of media providers for supporting a session between the plurality of terminals 102.

At block 330, when a network quality associated with the selected media provider 140 drops below a predetermined threshold, or a data feed from the selected media provider 140 is interrupted in the media stream 104 during the session, the method 300 further includes discontinuing execution of the selected media provider 140 with the session controller 142. The network quality refers to an industry standard of QoS (Quality of Service) or QoE (Quality of Experience) and may include metrics such as packet loss, delay, jitter, etc. These aspects are built into the session controller 142. With continued reference to block 330, the method 300 further includes selecting a second media provider from among the plurality of media providers 148 with the session controller 142. In an embodiment, the session controller 142 terminates the session between the first terminal 110 and the second terminal 114 before selecting the second media provider from among the plurality of media providers 148.

As such, the session controller 142 may support the media stream 104 between the SDK 134 at the first terminal 110 and the second selected media provider at the second terminal 114. With this construction, the system 100 executed under the method 300 is adaptable to varying aspects of media providers among the plurality of media providers 148 for supporting the media stream 104 between the first terminal 110 and the second terminal 114.

At block 332, the method 300 includes performing session management, clinical functions, or regulating participant control during the session with the session controller 142 based on the first user input 122 received at the first terminal 110 by the SDK 134. In this regard, the first user 112 may begin and end a session between the first terminal 110 and the second terminal 114 based on the first user input 122 at the first terminal 110. Also, the first user 112 may admit the second user 120 to the session through the second terminal 114, and permit the second user 120 to contribute to the media stream 104 through the second terminal 114 based on the first user input 122 at the first terminal 110.

At block 334, the method includes outputting the outgoing media data 130, the incoming media data 132, and the session information 154 to the first user 112 and the second user 120 respectively through the first user interface 156 at the first terminal 110 and the second user interface 172 at the second terminal 114. In this regard, the first user interface 156 receives the incoming media data 132 and the session information 154 from the media stream 104 for being output with the outgoing media data 130 generated at the first terminal 110. The second user interface 172 receives the outgoing media data 130 from the media stream 104 for being output with the incoming media data 132 and the session information 154 generated at the second terminal 114.

Figure 4:
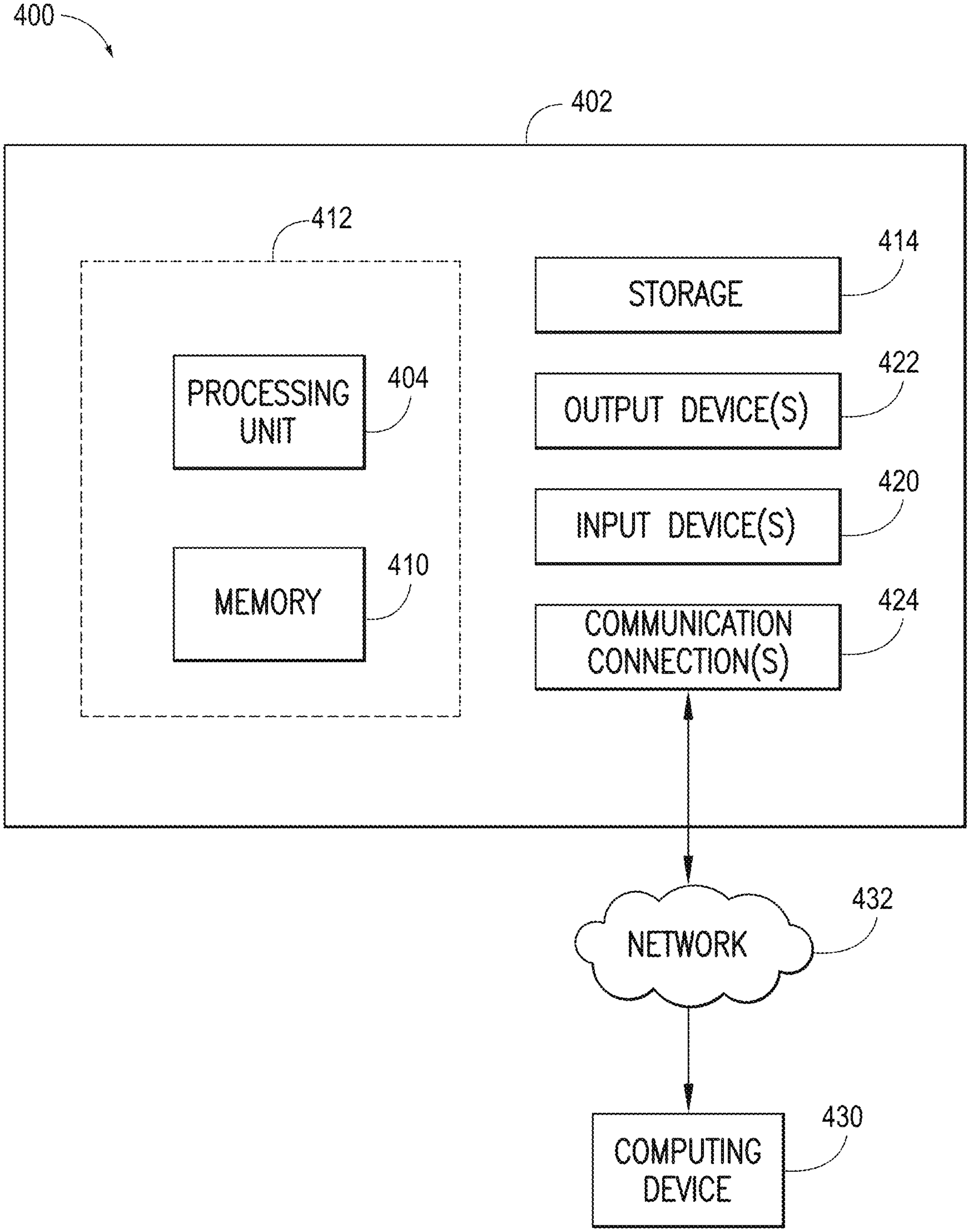
FIG. 4 is an illustration of an example computing environment where one or more of the provisions set forth herein are implemented, according to one aspect.

FIG. 4 and the following discussion provide a description of a suitable operating environment to implement aspects of one or more of the provisions set forth herein. The operating environment of FIG. 4 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, which perform one or more tasks or implement one or more abstract data types. Typically, the functionality of the computer readable instructions is combined or distributed as desired in various environments.

FIG. 4 illustrates a system 400 including a computing device 402 configured to implement one aspect provided herein. In one configuration, the computing device 402 includes at least one processing unit 404 and memory 410. Depending on the exact configuration and type of computing device, memory 410 may be volatile, such as RAM, non-volatile, such as ROM, flash memory, etc., or a combination of the two. This configuration is illustrated in FIG. 4 by dashed line 412.

In other aspects, the computing device 402 includes additional features or functionality. For example, the computing device 402 may include additional storage such as removable storage or non-removable storage, including, but not limited to, magnetic storage, optical storage, etc. Such additional storage is illustrated in FIG. 4 by storage 414. In one aspect, computer readable instructions to implement one aspect provided herein are in storage 414. Storage 414 may store other computer readable instructions to implement an operating system, an application program, etc. Computer readable instructions may be loaded in the memory 410 for execution by the at least one processing unit 404, for example.

The term "computer readable media" as used herein includes computer storage media. Computer storage media includes volatile and nonvolatile, removable, and non-removable media implemented in any method or technology for storage of information such as computer readable instructions or other data. Memory 410 and storage 414 are examples of computer storage media. Computer storage media includes, but is not limited to, RAM, ROM, EEPROM, flash memory or other memory technology, CD-ROM, Digital Volatile Disks (DVDs) or other optical storage, magnetic cassettes, magnetic tape, magnetic disk storage or other magnetic storage device, or any other medium which may be used to store the desired information and which may be accessed by the computing device 402. Any such computer storage media is part of the computing device 402.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 402 includes input device(s) 420 such as keyboard, mouse, pen, voice input device, touch input device, infrared cameras, video input devices, or any other input device. Output device(s) 422 such as one or more displays, speakers, printers, or any other output device may be included with the computing device 402. Input device(s) 420 and output device(s) 422 may be connected to the computing device 402 via a wired connection, wireless connection, or any combination thereof. In one aspect, an input device or an output device from another computing device may be used as input device(s) 420 or output device(s) 422 for the computing device 402. The computing device 402 may include communication connection(s) 424 to facilitate communications with one or more other computing devices 430, such as through network 432, for example.

Figure 5:
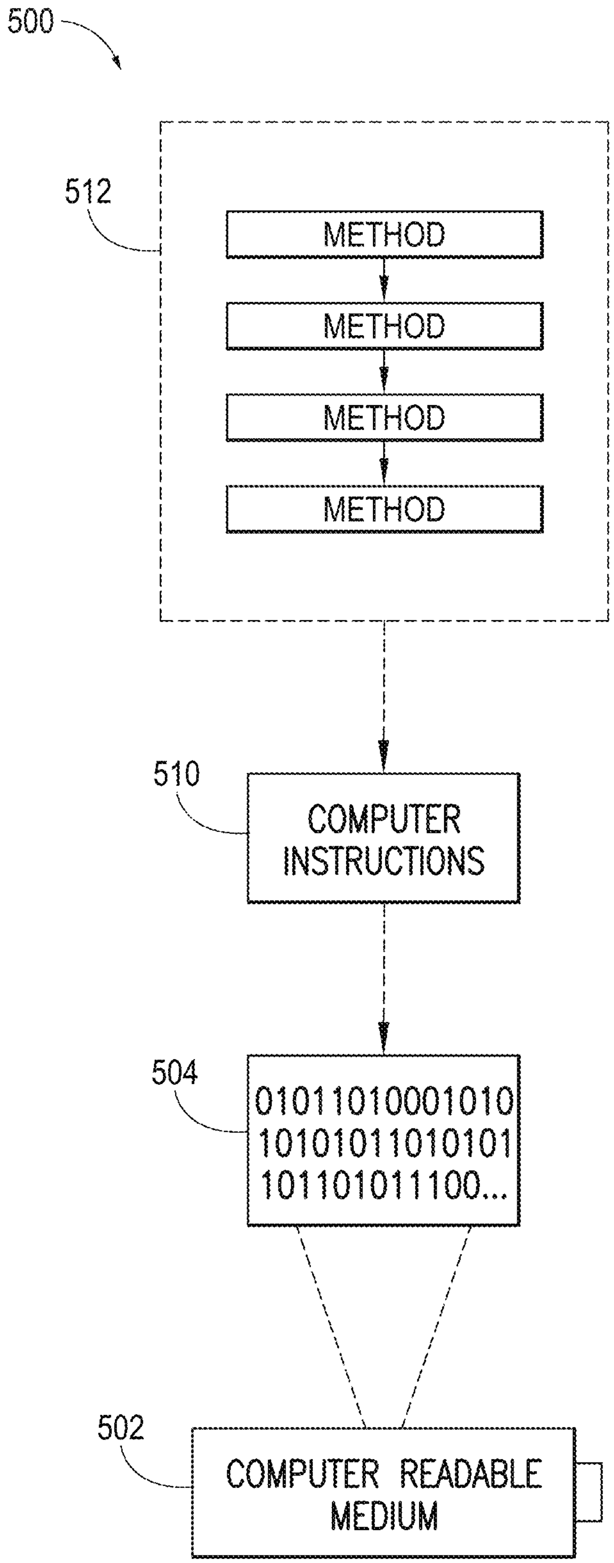
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, where an implementation 500 includes a computer-readable medium 502, such as a CD-R, DVD-R, flash drive, a platter of a hard disk drive, etc., on which is encoded computer-readable data 504. This encoded computer-readable data 504, such as binary data including a plurality of zero's and one's as shown in 504, in turn includes a set of processor-executable computer instructions 510 configured to operate according to one or more of the principles set forth herein. In this implementation 500, the processor-executable computer instructions 510 may be configured to perform a method 512, such as the computer-implemented method 300 of FIG. 3. In another aspect, the processor-executable computer instructions 510 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, various presently unforeseen or unanticipated alternatives, modifications, variations, or improvements therein may be subsequently made by those skilled in the art which are also intended to be encompassed by the following claims.

The invention claimed is:

1. A computer-implemented method of connecting terminals in a media stream, the method comprising:

receiving a first user input at a first terminal with a media agnostic software development kit (SDK);

initiating a session between the first terminal and a second terminal with a session controller based on the first user input received with the SDK;

selecting a media provider from among a plurality of media providers for use by the second terminal during the session with the session controller, wherein the plurality of media providers are configured to adapt a plurality of device hardware types including a plurality of operating systems to function as the first terminal and the first user interface, and the second terminal, the plurality of devices having different operating systems, wherein the session controller supports a media stream between the SDK at the first terminal and the selected media provider at the second terminal; and transmitting outgoing media data from the SDK at the first terminal to the selected media provider at the second terminal, or incoming media data from the selected media provider at the second terminal to the SDK at the first terminal as part of the media stream, wherein the session controller selects the selected media provider based on a provider-specific optimization including adaptive bitrate control, noise reduction, and collaboration tools.

2. The method of claim 1, further comprising:

generating session information associated with the selected media provider, wherein the session information is associated with the media stream;

transmitting the session information to the session controller;

determining a real-time data synchronization between the SDK and the selected media provider with the session controller based on the session information; and maintaining the media stream supported by the selected media provider, or selecting a second media provider from among the plurality of media providers with the session controller based on the determined real-time synchronization, wherein the second media provider supports the media stream.

3. The method of claim 2, further comprising:

executing the selected media provider with the session controller via a media service to create the session;

transmitting the session information to the session controller from the selected media provider via the media service; and determining the real-time data synchronization between the SDK and the selected media provider based on the session information received at the session controller from the media service.

4. The method of claim 1, further comprising:

generating the outgoing media data at the first terminal based on the first user input, wherein the outgoing media data indicates a state of a first user;

transmitting the outgoing media data to the second terminal via the SDK and the selected media provider as part of the media stream; and transmitting the incoming media data to the first terminal via the SDK and the selected media provider as part of the media stream based on a second user input at the second terminal, wherein the incoming media data indicates a state of a second user.

5. The method of claim 4, wherein each media provider in the plurality of media providers is compatible with the first terminal to generate the incoming media data for representation by a first user interface at the first terminal, and compatible with the second terminal to represent the outgoing media data with a second user interface at the second terminal.

6. The method of claim 5, wherein the selected media provider is a second media provider, and the method further comprises selecting a first media provider from among the plurality of media providers, wherein the session controller supports the media stream between the SDK and both the first media provider and the second media provider at the same time, and the first media provider includes a function that is unique to the second media provider in the media stream.

7. The method of claim 6, wherein the unique function is supporting a biometric data feed, a video data feed, an audio data feed, or a text data feed in the media stream.

8. The method of claim 6, wherein the first media provider and the second media provider communicate information between the SDK and the second terminal independently of each other, and in parallel to each other.

9. The method of claim 1, wherein the selected media provider is a second media provider, and the method further comprises:

selecting a first media provider for use by the SDK during the session, wherein the first media provider is different from the second media provider; and interfacing the first media provider with the second media provider in the media stream, wherein the media stream is supported between the SDK at the first terminal and the second media provider at the second terminal through the first media provider.

10. The method of claim 1, wherein selecting the media provider among the plurality of media providers includes selecting the media provider based on a predetermined user preference, a user request received as part of the first user input, or a unique functionality among the plurality of media providers.

11. The method of claim 1, wherein when a network quality associated with the selected media provider drops below a threshold, or a data feed from the selected media provider is interrupted in the media stream during the session, the method further comprises:

discontinuing execution of the selected media provider with the session controller, wherein the selected media provider is a first media provider; and selecting a second media provider with the session controller, wherein the session controller supports a media stream between the SDK at the first terminal and the second media provider at the second terminal.

12. The method of claim 1, further comprising:

generating session information with the selected media provider at the second terminal, during the session, wherein the session information is associated with the media stream;

transmitting the session information to the SDK at the first terminal; and outputting the session information at a first user interface included in the first terminal.

13. The method of claim 12, further comprising outputting the session information with the incoming media data or the outgoing media data at the first user interface.

14. The method of claim 1, further comprising:

formatting a first user interface of the first terminal with the SDK, wherein the first user interface is configured to receive the first user input and output the incoming media data, and the SDK formats the first user interface in the same manner for each device adapted to function as the first terminal.

15. The method of claim 1, further comprising performing session management or regulating participant control during the session with the session controller based on the first user input received at the first terminal by the SDK.

16. The method of claim 1, wherein the SDK communicates the media stream or session information with the selected media provider through the session controller or a media service on a cloud computing platform operatively connected to the first terminal and the second terminal.

17. A system for connecting terminals in a media stream, the system comprising:
- a first terminal that receives a first user input with a media agnostic software development kit (SDK); and
- at least one processor that:
  - initiates a session between the first terminal and a second terminal with a session controller based on the first user input received with the SDK;
  - selects a media provider from among a plurality of media providers for use by the second terminal during the session with the session controller,
  - wherein the plurality of media providers are configured to adapt a plurality of device hardware types including a plurality of operating systems to function as the first terminal and the first user interface, and the second terminal, the plurality of devices having different operating systems,
  - wherein the session controller supports a media stream between the SDK at the first terminal and the selected media provider at the second terminal; and
  - transmits outgoing media data from the SDK at the first terminal to the selected media provider at the second terminal, or incoming media data from the selected media provider at the second terminal to the SDK at the first terminal as part of the media stream,
  - wherein the session controller selects the selected media provider based on a provider-specific optimization including adaptive bitrate control, noise reduction, and collaboration tools.

18. A non-transitory computer readable storage medium storing instructions that, when executed by a computer having a processor, causes the processor to perform a method, the method comprising:
- receiving first user input at a first terminal with a media agnostic software development kit (SDK);
- initiating a session between the first terminal and a second terminal with a session controller based on the first user input received with the SDK;
- selecting a media provider from among a plurality of media providers for use by the second terminal during the session with the session controller,
- wherein the plurality of media providers are configured to adapt a plurality of device hardware types including a plurality of operating systems to function as the first terminal and the first user interface, and the second terminal, the plurality of devices having different operating systems,
- wherein the session controller supports a media stream between the SDK at the first terminal and the selected media provider at the second terminal; and
- transmitting outgoing media data from the SDK at the first terminal to the selected media provider at the second terminal, or incoming media data from the selected media provider at the second terminal to the SDK at the first terminal as part of the media stream,
- wherein the session controller selects the selected media provider based on a provider-specific optimization including adaptive bitrate control, noise reduction, and collaboration tools.

* * * * *